United States Patent [19]

Brackett et al.

[11] 4,236,256

[45] Nov. 25, 1980

[54] ASYNCHRONOUS DATA RECEIVER

[75] Inventors: Charles A. Brackett, Summit, N.J.; Stewart D. Personick, Cupertino, Calif.

[73] Assignee: Bell Telephone Laboratories, Incorporated, Murray Hill, N.J.

[21] Appl. No.: 23,736

[22] Filed: Mar. 26, 1979

[51] Int. Cl.[2] .................. H04B 1/00; H04L 25/49; G08C 9/00
[52] U.S. Cl. ........................ 455/608; 375/17; 340/347 DD
[58] Field of Search ............ 358/262; 325/38 A, 321, 325/324; 250/199; 340/347 DD; 178/68, 88; 328/187; 307/209, 261

[56] References Cited

U.S. PATENT DOCUMENTS

| | | | |
|---|---|---|---|
| 3,701,144 | 10/1972 | Fineran et al. | 328/39 A |
| 3,714,437 | 1/1973 | Kinsel | 325/38 A |
| 4,001,578 | 1/1977 | Cook et al. | 325/38 A |
| 4,027,152 | 5/1977 | Brown et al. | 250/199 |
| 4,051,363 | 9/1977 | Fish | 250/199 |
| 4,096,527 | 6/1978 | Furuta | 358/262 |

*Primary Examiner*—John C. Martin
*Assistant Examiner*—Edward L. Coles
*Attorney, Agent, or Firm*—Michael J. Urbano

[57] ABSTRACT

A transitionally encoded data signal, which has a DC component and a bipolar AC component, is detected in an asynchronous receiver which includes a filter 16 for separating the AC and DC components into separate circuit paths, an amplifier 22 in the AC path, a feed-forward network 28 in the DC path for establishing a pair of threshold levels $V_{th+}$ and $V_{th-}$ for detecting the positive and negative bipolar pulses, respectively, a dual comparator 26 for comparing the output of the amplifier with each of said threshold levels and for generating an output pulse whenever the thresholds are exceeded, and a set-reset flip-flop 34 responsive to the output pulses for reconstructing the binary signal which was transitionally encoded at the transmitter. Use of the receiver in a fiber-optic lightwave system is specifically described.

8 Claims, 4 Drawing Figures

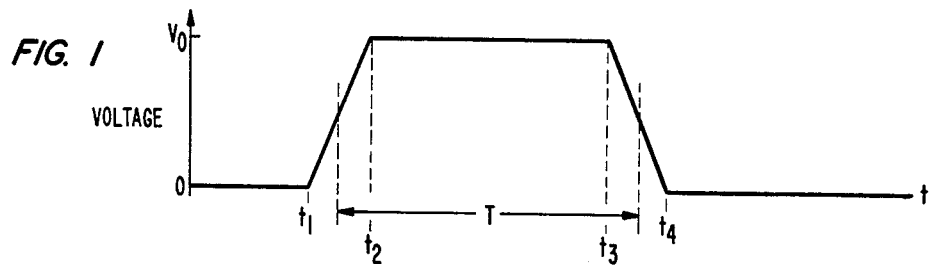
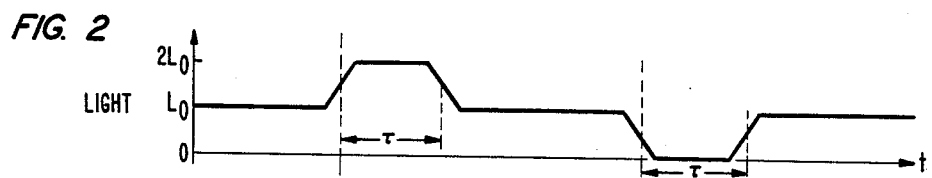
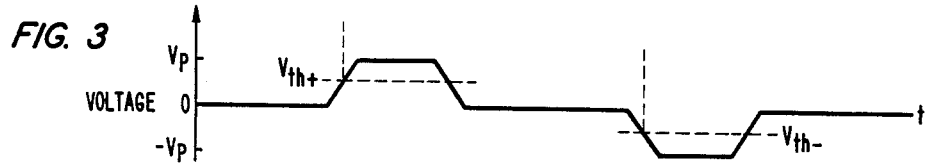
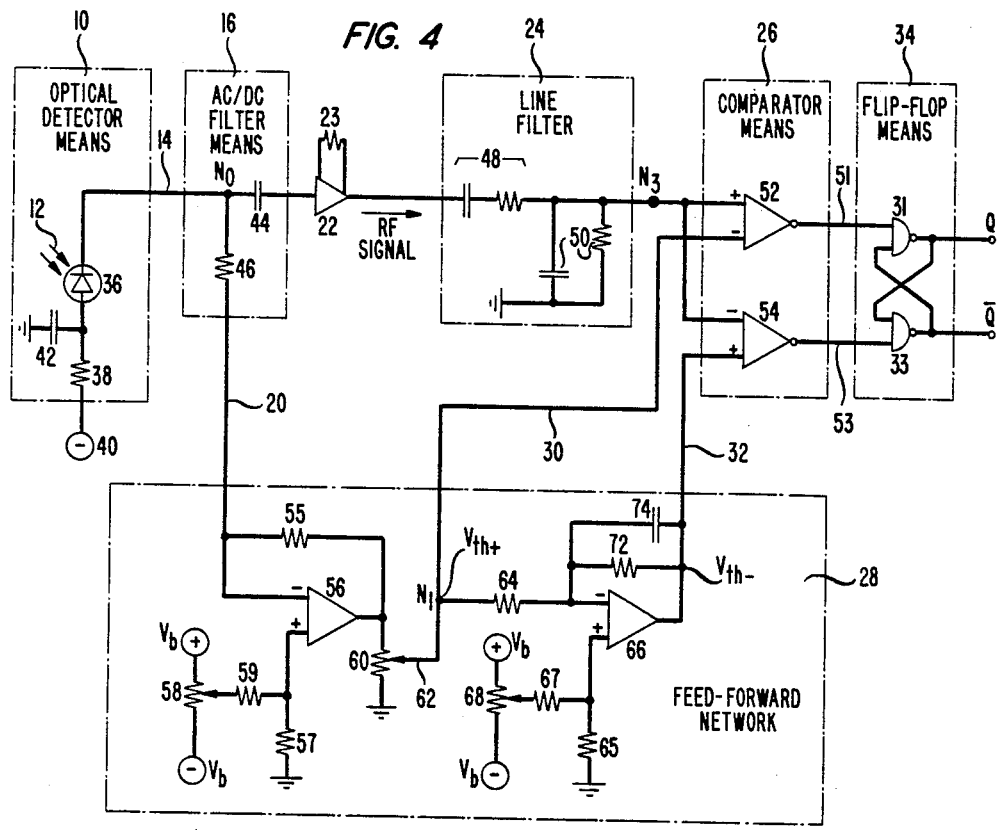

ASYNCHRONOUS DATA RECEIVER

BACKGROUND OF THE INVENTION

This invention relates to asynchronous data receivers and especially to such receivers for use in optical data links.

Fiber-optic data links have been proposed as a substitute for coaxial and other wired links to interconnect a variety of electronic equipments such as computers and the like. In the No. 4 Electronic Switching System manufactured by Western Electric Company, such data links may one day interconnect time slot interchangers with voice interface frames, time multiplexed switches with clock circuits, and peripheral unit buses with the No. 1A processor and the time multiplexed switches.

These fiber-optic data links are being given serious consideration as replacements for coaxial cable links for a number of reasons: optical signals offer wider bandwidth and are immune to electromagnetic interference; and fiber-optic interconnections electrically isolate the interconnected equipment on different frames, and reduce the cable congestion on frames.

Ideally, an optical data link, in some applications, should have an input-output characteristic which is completely independent of the input data format; that is, the data link should not be sensitive to how often, or how infrequently, data pulses occur. In addition, the link should not depend on a fixed data pulse width or on a clocked stream of data pulses.

Usually, an optical transmitter encodes a data signal into binary, or two-level, optical signal where the light from a junction laser or LED, for example, is modulated between zero (or near zero) intensity and some predetermined peak light amplitude in accordance with information to be transmitted. This modulated light signal is then processed in a linear fashion (detected, amplified, filtered) through an optical receiver up to the point of a threshold detection circuit. The optical data signal can be decoded either by detecting the light amplitude and using it to set a threshold level or by detecting the zero crossings of the signal in the case that the duty cycle averages 50%. But, neither of these techniques can be made to work well with very infrequent data (e.g., duty cycles of less than a few percent). A typical prior art solution to this problem in a clocked system is to scramble the data at the transmitter in such a way that a 50% duty cycle results and then to unscramble it in the receiver. Another approach uses various coding schemes such as Manchester coding. In this type of coding every data pulse interval of duration T is converted to a data pulse of duration T/2 in the first half of the time slot and no data pulse in the last half of the time slot, or conversely. The (10) coding would correspond, for example, to the presence of a data pulse of duration T, whereas the converse (01) coding would correspond to absence of a data pulse in the interval T. In unclocked (asynchronous) systems, however, these methods do not work.

Instead, asynchronous systems often utilize a three-level transitional coding scheme; that is, at the transmitter each transition of an input binary electrical data pulse of duration T (FIG. 1) is coded into an electrical pulse of duration $\tau < T$, which in turn is used to modulate the light amplitude of a laser or LED light source, thus generating a transitionally encoded, three-level optical signal (FIG. 2). More specifically, when no data pulse is present (FIG. 1, V=0 for $t<t_1$), the light source emits a DC light amplitude designated $L_o$ in FIG. 2. For a leading edge, upward transition of a data pulse (FIG. 1, from 0 to $V_o$ in $t_1$ to $t_2$), the light amplitude doubles ($2L_o$) for a relatively short time $\tau < T$ (FIG. 2) and then returns to the DC level $L_o$. For a trailing edge, downward transition of the data pulse (FIG. 1, from $V_o$ to 0 in $t_3$ to $t_4$), the light amplitude decreases to zero (or near zero) for an equal time $\tau$ and then returns to the DC level $L_o$.

At the receiver of the asynchronous system, the transitionally encoded light signal is converted to an equivalent bipolar electrical signal by a suitable photodetector. Thresholds are set up to detect the pulses of the bipolar electrical signal and logic circuits reconstruct the original binary electrical signal from the leading edges of the bipolar signal.

One prior art fiber-optic system of this type is described in U.S. Pat. No. 4,027,152 granted to W. W. Brown et al on May 31, 1977. The transmitter generates transitionally encoded light pulses and, in addition, a refresh light pulse of the same polarity as the preceding pulse whenever there has been no pulse for a predetermined amount of time. In the receiver shown in FIG. 4 of the patent, a peak detector 126 is used to provide automatic gain control (AGC) to the received signal which, in turn, maintains a constant signal amplitude at the input of a level shifting network (resistive ladder 110) and a comparator 114. In order to compensate for the level shifts due to the inherent offsets of the linear amplifiers, and to remove the DC component from the output of photodiode 100, a DC feedback network 134,135 forces the DC amplitudes of the differential outputs of the linear gain stage 104,108 to be equal. In order for the system to remain operative, the AGC amplifier 104 must remain active, which means that the peak detection circuit 126 must remain charged. This charging function is performed by the refresh pulses which do not alter the state of flip-flop 116 and, therefore, do not in principle interfere with the transmitted data pulses. In practice, however, we have found that the refresh pulses do interfere with the operation of the fiber-optic link. When a refresh pulse occurs at a data pulse transition, the transition time may be altered by as much as 15 nsec or more. This coincidence of refresh and data pulses results in a data dependent jitter and pulse width variation which is objectionable in some applications such as the proposed No. 4 ESS fiberoptic data link.

SUMMARY OF THE INVENTION

In accordance with our invention, a transitionally encoded data signal, which has a DC component and a bipolar AC component, is detected without the need to transmit refresh pulses, and thus without the attendant jitter problems. Our asynchronous receiver illustratively includes filter means for separating the AC and DC components of the signal into separate circuit paths, amplifier means in the AC path, feed-forward means in the DC path for establishing a pair of threshold levels $V_{th+}$ and $V_{th-}$ for detecting the positive and negative bipolar pulses, respectively, comparator means for comparing the output of the amplifier means with each of the threshold levels and for generating an output pulse whenever the thresholds are exceeded, and flip-flop means responsive to the output pulses for reconstructing the binary signal which was transitionally encoded at the transmitter.

It should be understood that our invention is not limited in its application to lightwave systems. Since the output of the photodetector in a lightwave receiver is an equivalent electrical signal which is then processed electrically, it is apparent that the system could be purely electrical and the principles of our receiver would still apply.

BRIEF DESCRIPTION OF THE DRAWING

Our invention, together with its various features and advantages, can be readily understood from the following more detailed description taken in conjunction with the accompanying drawing in which:

FIG. 1 is a waveform of a binary electrical signal showing a pulse of duration T and peak amplitude $V_o$ as measured between the half peak amplitude points;

FIG. 2 is a waveform of a transitionally encoded, three-level light signal which includes a DC level $L_o$, a pulse of duration $\tau < T$ and peak amplitude $2L_o$ corresponding to the leading edge, upward transition of the electrical pulse of FIG. 1, and a similar pulse of peak amplitude zero (or near zero) corresponding to the trailing edge, downward transition of the pulse of FIG. 1;

FIG. 3 is a waveform of the AC electrical component of the transitionally encoded signal of FIG. 2 after it has been detected by a suitable photodetector; and FIG. 4 is a circuit schematic of an asynchronous optical receiver in accordance with one embodiment of our invention.

DETAILED DESCRIPTION

One embodiment of an asynchronous optical receiver for detecting a transitionally encoded light signal (FIG. 2) is shown in the circuit schematic of FIG. 4. The receiver comprises optical detector means 10 for converting the lightwave signal 12 to a corresponding electrical signal on lead 14. AC/DC filter means 16 separates the three-level, transitionally encoded electrical signal into its AC, bipolar component (FIG. 3) in one circuit path 18 and into its DC component corresponding to $L_o$ in circuit path 20. The AC component, which is a pulsed data signal typically at a RF bit rate, is amplified by suitable amplifier means 22 before being passed through a high frequency line filter 24 to the input of comparator means 26.

The DC path 20 includes a feed-forward network which generates a pair of threshold voltage levels $V_{th-}$ and $V_{th-}$ on leads 30 and 32, respectively. The thresholds serve as reference inputs to comparator means 26 which generates an output pulse on lead 51 whenever the AC signal is more positive than $V_{th+}$ and a pulse on lead 53 whenever the AC signal is more negative than $V_{th-}$. These outputs of comparator means 26 are applied to the inputs of flip-flop means 34 which reconstructs the original binary electrical signal at its output terminal designated Q. The complement of the original binary signal appears at output $\overline{Q}$.

More specifically, optical detector means 10 typically includes a photodiode 36 designed to be responsive to the wavelength of the incoming lightwave 12. Illustratively, lightwave 12 is carried by suitable wave guiding means such as an optical fiber (not shown). Suitable photodiodes for wavelengths of about 0.8–1.0 μm include a Si p-i-n photodiode or a Si avalanche photodiode of the type described by A. R. Hartman et al in U. S. Pat. No. 4,127,932, or an AlGaAs double heterostructure photodiode of the type described by R. C. Miller et al in *Applied Physics Letters*, Vol. 33, No. 8, page 721 (1978). For longer wavelengths of approximately 1.0–1.7 μm, the photodiode can be fabricated of other materials such as Ge [H. Ando et al, *IEEE Journal of Quantum Electronics*, QE-14, No. 11, page 804 (1978)], GaAlAsSb [L. R. Tomasetta et al, *IEEE Journal of Quantum Electronics*, QE-14, No. 11, page 800 (1978)], or InGaAsP-InP [M. A. Washington, et al *Applied Physics Letters*, Vol. 33, No. 10, page 854 (1978)]. In any event, the photodiode 36 may be reversed biased by connecting its anode through a resistor 38 a source of negative potential 40. The node between the diode 36 and resistor 38 is coupled through a capacitor 42 to a source of reference potential, depicted as ground, in order to isolate the lead 14 from the power supply 40 and to provide an AC return path (not shown) for the amplifier means 22.

The AC/DC filter means 16 comprises a capacitor 44 in the AC path 18 between the photodiode 36 and the amplifier means 22 and a resistor 46 between the diode 36 and the feed-forward network 28.

Amplifier means 22 typically includes a transimpedance (current-to-voltage) preamplifier, in which the ratio of the output voltage to the input current is illustratively about 10 kΩ, followed by a suitable wide band voltage amplifier, not shown but well known in the art.

Line filter 24 illustratively comprises the series combination 48 of a resistor and capacitor connected in series between the output of amplifier means 22 and the AC inputs of comparator means 26, and the parallel combination 50 of another resistor and capacitor connected between the AC inputs to comparator means 26 and ground. The purpose of the line filter 24 is to shape the pulses and render them suitable for regeneration or decision. In addition, it functions as a noise rejection filter mostly for high frequency components and also filters out the DC component so that the AC component can be compared with the thresholds in comparator means 26.

Comparator means 26 comprises a pair of differential amplifiers, each of which has inverted outputs. One differential amplifier 52 has the AC or RF signal from line filter 24 as its positive input and $V_{th+}$ from network 28 as its negative input. Conversely, differential amplifier 54 has the AC signal as its negative input and $V_{th-}$ as its positive input. Differential amplifier 52 produces an output pulse whenever the AC signal is more positive than $V_{th+}$, and correspondingly amplifier 54 generates a pulse whenever the AC signal is more negative than $V_{th-}$. The dual outputs of comparator means 26 are applied to the dual inputs of a conventional set-reset flip-flop circuit designated by means 34. As is well known in the art, flip-flop means 34 includes a pair of NAND gates 31 and 33 cross-coupled as shown so that it experiences no change of state when it receives either two consecutive set pulses on line 51 or two consecutive reset pulses on line 53. Rather, it changes state only when a set pulse is followed by a reset pulse, or conversely. Thus, referring to FIG. 3, the leading edge of positive pulse $V_p$ would cause $V_{th+}$ to be exceeded and the Q output of flip-flop means 34 to be high. Q remains high until the leading edge of negative pulse $-V_p$ is more negative than $V_{th-}$. Then, $\overline{Q}$ goes high forcing Q to be low, thereby regenerating the binary pulse of FIG. 1.

As mentioned previously, the threshold levels for comparator means 26 are generated by feed-forward network 28. In particular, the DC component of the detected three-level signal appears on lead 20 and is applied to the negative input terminal of a transimpedance amplifier 56. The postive input to amplifier 56 is derived from an offset-trim potentiometer 58. The output of amplifier 56 is applied across a threshold adjust potentiometer 60. The upper threshold level $V_{th+}$ appears on the wiper 62 which is connected directly via lead 30 to the negative input of the differential amplifier 52 of comparator means 26. Wiper 62 is also connected through a node $N_1$ and resistor 64 to the negative input of a unity gain amplifier (inverter) 66. As with amplifier 56, the positive input to amplifier 66 is derived from an offsettrim potentiometer 68. To achieve unity gain, the input resistor 64 and the feedback resistor 72 of amplifier 66 should have equal values. Capacitor 74 in parallel with resistor 72 provides stabilization against oscillations in amplifier 66. The output of amplifier 66 is the lower threshold level $V_{th-}$ which is applied via lead 32 to the positive input of differential amplifier 54 of comparator means 26.

Since amplifier 66 acts as an inverter, it is apparent that in this configuration $|V_{th+}| = |V_{th-}|$, a preferred embodiment for simplicity of design.

It is also preferred that the gain of transimpedance amplifier 56 match that of amplifier means 22 so that any changes in the peak voltage of the bipolar electrical signal at node $N_o$ are accompanied by proportional changes in the threshold levels to the end that $V_p/V_{th}$ is essentially constant at the input of comparator means 26. Typically, $V_p/V_{th}=2$, which is achieved by making the transimpedance at node $N_1$ (the output of amplifier 56) equal to one-half of the transimpedance at node $N_3$ (the output of line filter 24). In general, if $V_p/V_{th}=f$ then the ratio of the transimpedances $N_3/N_1=f$, where f is any real number greater than one.

EXAMPLE

The following example is given by way of illustration only. Component values should not be construed as limitations upon the scope of the invention unless expressly so stated.

Our asynchronous receiver was utilized in a 128-channel fiber-optic data link at a 16 megabit data rate. In this time-multiplexed system, each 125 μsec long frame contained 128 words or channels corresponding, for example, to 128 telephone conversations. Each word was 600 nsec long but was contained in a 960 nsec time slot. Each word contained 10 data bits (binary pulses), each of which was 60 nsec long (T=60 nsec in FIG. 1). The binary pulses were transitionally encoded into electrical pulses about 35 nsec long and used to modulate the light output of an AlGaAs LED emitting at about 0.82 μm (τ=35 nsec in FIG. 2). At the receiver, the light signal (FIG. 2) was detected by a photodiode 36 (FIG. 4) which was a Si APD of the type described in the patent of A. R. Hartman et al, supra. The APD generated a photocurrent waveform corresponding to FIG. 2 in which the 2L_o level yielded about 2 μA of current.

The circuit of FIG. 4 had the component values listed in the table below.

| Numerical Designation | Component Type | Description |
|---|---|---|
| 12 | APD | Avalanche gain M = 12-20 at 130 V and dark current < 10 nA |
| 38 | resistor | 100 kΩ |
| 40 | supply | −130 V |
| 42 | capacitor | .001 μF (1 kV) |
| 44 | capacitor | 0.1 μF |
| 46 | resistor | 220 kΩ |
| 22 | amplifier | (see below) |
| 23 | resistor | 15 kΩ |
| 48 | capacitor-resistor | 1.0 μF 220 Ω |
| 50 | capacitor-resistor | 56.2 pF 220 Ω |
| 26 | comparator-flip-flop | 521 Dual Comparator |
| 34 | | manufactured by Signetics Corporation with output gates wired as a set-reset flip-flop |
| 56 | amplifiers | TL082C Dual BIFET |
| 66 | | OPAMP manufactured by Texas Instruments Corporation |
| 58 | potentiometer | 20 kΩ, 10 turns |
| 68 | | |
| 57 | resistor | 1 kΩ |
| 65 | | |
| 59 | resistor | 220 kΩ |
| 67 | | |
| 60 | potentiometer | 500 Ω, 10 turns |
| $V_b$ | supply | ±5 V |
| 55 | resistor | 22 kΩ |
| 64 | resistor | 100 kΩ |
| 72 | resistor | 100 kΩ |
| 74 | capacitor | 162 pF |

In this experimental system, amplifier means 22 included a number of well-known stages: a transimpedance (current-to-voltage) amplifier comprising a common emitter transistor driving a common collector transistor with the base of the former coupled to the emitter of the latter through a 15 kΩ feedback resistor 23; the voltage output of the transimpedance amplifier was itself amplified by a two-transistor, wide bandwidth voltage amplifier; and the output of the latter was coupled to line filter 24 by a buffer stage comprising an emitter follower transistor. Inasmuch as this design was adequate for our purposes, but necessarily not optimal, other commercially available amplifiers could be substituted for the various stages; e.g., the first stage transimpedance amplifier could be a TIXL151 manufactured by Texas Instruments Corporation.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, while we have described the foregoing example in terms of discrete components, it will be apparent that the circuit of FIG. 4 could readily be fabricated in integrated form.

We claim:

1. An asynchronous receiver for generating a binary electrical signal from a three-level electrical signal having a DC component and a bipolar AC component superimposed on said DC component, in which a positive pulse of the bipolar component corresponds to one transition of the binary signal and a negative pulse of the bipolar component corresponds to the opposite transition of the binary pulse, characterized by filter means (16) for separating said DC component from said AC component into separate circuit paths, amplifier means (22) in one of said paths for amplifying said AC component, feed-forward means (28) in the other of said paths for generating from said DC component a pair of voltage thresholds, comparator means (26) for comparing said amplified AC component with each of said thresholds and for generating an electrical pulse whenever said AC component is more positive than one of said thresholds or more negative than the other of said thresholds, and flip-flop means (34) responsive to the output of said comparator means for regenerating said binary electrical signal.

2. The receiver of claim 1 including high frequency filter means connected between the output of said amplifier means and the input of said comparator means.

3. The receiver of claim 1 wherein said threelevel signal is a lightwave signal and further including optical detector means for converting said lightwave signal to an equivalent electrical signal, the output of said detector means being coupled to the input of said filter means.

4. The receiver of claim 1 wherein said amplifying means in said AC path comprises a first transimpedance amplifier, said feed-forward means comprises a second transimpedance amplifier having said DC component as one of its inputs and generating one of said threshold levels at its output, the gains of said first and second transimpedance amplifiers being mutually adapted so that the ratio of the peak amplitude of the pulses of the bipolar component to the absolute value of the threshold levels remains essentially constant in time at the input of said comparator means.

5. The receiver of claim 4 wherein said feed-forward means includes an inverter responsive to the output of said second transimpedance amplifier for changing the sign of said threshold level, the output of said inverter being applied to the input of said comparator means.

6. The receiver of claim 4 wherein said threshold levels are equal and opposite in sign to each other, and the absolute value of the threshold levels is equal to 1/f the magnitude of said peak amplitude, and wherein the transimpedance between the input to said filter means and the input to said comparator means is equal to f times the transimpedance between the input to said filter means and the output of said second amplifier.

7. The receiver of claim 5 wherein said comparator means comprises a pair of differential amplifiers, said amplified AC component being applied to one input of each of said differential amplifiers, said voltage threshold at the output of said second transimpedance amplifier being connected to one input of one of said differential amplifiers and said opposite sign threshold at the output of said inverter being connected to the other input of said other differential amplifier, and said comparator means having a pair of outputs, one of which corresponds to the condition when said AC component is more positive than one of said threshold levels and the other of which corresponds to the condition when said AC component is more negative than the other of said threshold levels.

8. The receiver of claim 7 wherein said flip-flop means comprises a set-reset flip-flop responsive to the two outputs of said comparator means for regenerating said binary electrical signal.

* * * * *